Jan. 13, 1925.
J. STRASSNER
1,522,983
LAMINATED PULLEY AND THE LIKE
Filed Dec. 6, 1923  2 Sheets-Sheet 1
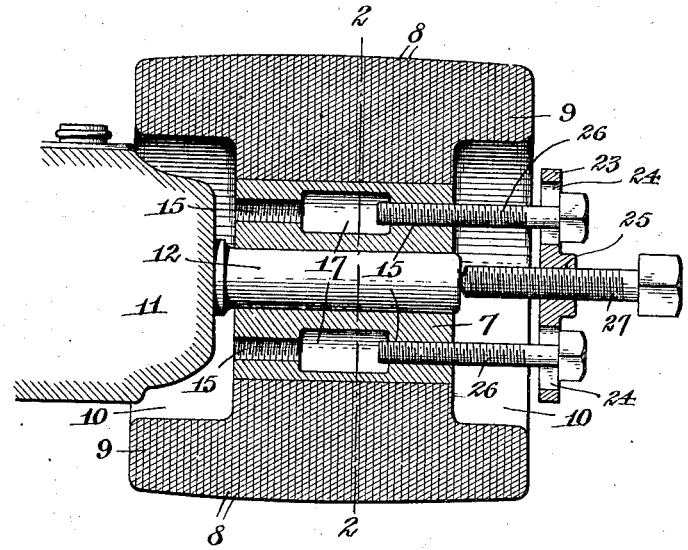
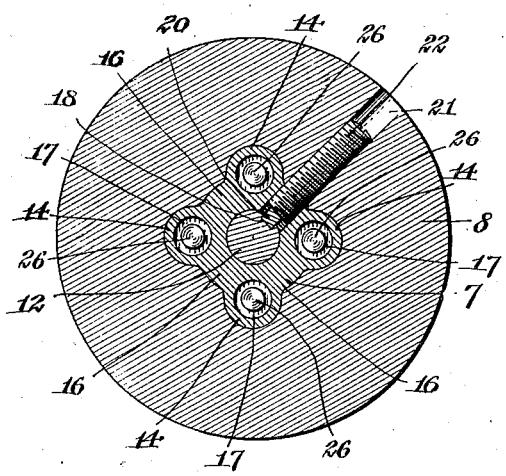
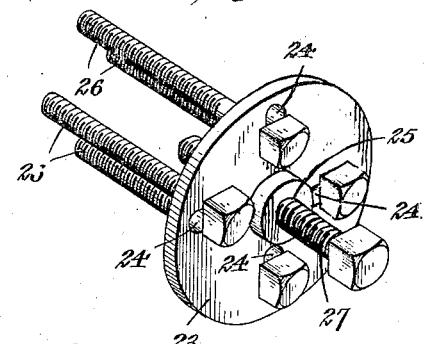
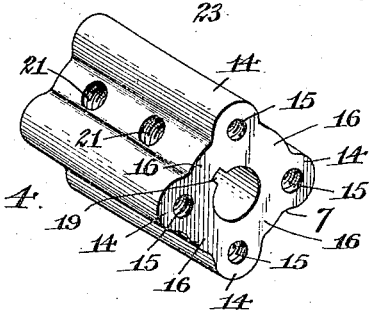
John Strassner, Inventor.
Witness:
J. J. Oberst.

Jan. 13, 1925.  1,522,983

J. STRASSNER

LAMINATED PULLEY AND THE LIKE

Filed Dec. 6, 1923  2 Sheets-Sheet 2

Witness:
J. J. Oberst,

John Strassner, Inventor.
By Emil Neubach
Attorney.

Patented Jan. 13, 1925.

1,522,983

UNITED STATES PATENT OFFICE.

JOHN STRASSNER, OF BUFFALO, NEW YORK.

LAMINATED PULLEY AND THE LIKE.

Application filed December 6, 1923. Serial No. 678,860.

*To all whom it may concern:*

Be it known that I, JOHN STRASSNER, a citizen of the United States, residing at Buffalo, in the county of Erie and State of New York, have invented certain new and useful Improvements in Laminated Pulleys and the like, of which the following is a specification.

My invention relates to improvements in laminated pulleys, or what are generally referred to as paper pulleys.

Paper pulleys are employed for the reasons, among others, that they are light in weight and possess greater adhering or tractive qualities than most other pulleys, and mainly for these two reasons are they commonly used on electric motors. Pulleys so used invariably have a shorter hub than body portion so that a decided cavity or depression is formed in the pulley at one or both ends, with the result that one end portion will surround a portion of the motor housing so as to limit the extent to which the pulley projects from the housing, thus permitting the projecting portion of the motor shaft to be shortened and bringing the circumferential center of the pulley closer to the shaft bearing than would otherwise be possible; all of which serve to minimize vibration of the projecting end of the motor shaft and aid in maintaining a good bearing within the motor housing.

For the reasons stated, paper pulleys are invariably applied to the projecting ends of motor shafts; but difficulty has been experienced in removing the pulley from the shaft when found necessary, owing to the fact that it has been impossible to place any object between the pulley and the motor housing capable of acting on the pulley with sufficient force to remove the same from the shaft, and this is especially true where the inner end of the pulley surrounds the motor housing.

In attempting to remove paper pulleys of the present day type from motor shafts, especially after having been secured to the shaft for a considerable length of time, the pulley becomes so battered or damaged as to be practically useless, and in many cases it has been found necessary to completely destroy the laminated or paper body portion of the pulley in order to gain access to the metallic hub of the pulley and remove the same from the shaft; and this in itself has been found a difficult piece of work, for the reason that the hub is in such close proximity to the motor housing as to make it impossible to place any tool or apparatus behind it which would serve to readily loosen the hub from the shaft.

Owing to the fact that a pulley that is very light in weight is desirable for use on a motor, laminated or paper pulleys are employed and such pulleys consist of a metallic hub invariably provided with a key-slot adapted to co-operate with the key slot in the motor shaft and receive within said slots a suitable key for fastening the pulley to the shaft; the metallic hub being as light in weight as possible and therefore comparatively small in diameter and the laminations or paper sections being built around the metallic hub and united in a practicable manner, wooden pins being invariably passed longitudinally through the laminated body so formed.

The primary object of my invention is to provide an improved pulley of the kind mentioned which can be easily removed from the motor shaft with comparatively very little or no increase in the weight of the pulley.

Another object of my invention is to provide a pulley of this kind, which can be applied to the shaft with either end of the pulley surrounding a portion of the motor housing.

A further object is to provide a pulley of this kind which can be pulled off the shaft to which it may be secured without in any manner engaging the paper or other non-metallic body portion of the pulley.

With the above objects in view, the invention consists in the novel features of construction and in the arrangement and combination of parts to be hereinafter described and more particularly pointed out in the subjoined claims.

In the drawings:—

Fig. 1 is a longitudinal section of a pulley constructed according to my invention and showing the same in connection with means for conveniently pulling the pulley from a motor shaft, the inner portion of the pulley being shown as surrounding the motor housing in the usual manner in which a laminated pulley of this kind is employed on a motor.

Fig. 2 is a transverse section taken on line 2—2, Fig. 1.

Fig. 3 is a detached perspective view of the means employed in connection with my improved pulley for easily removing the pulley from a shaft without in any manner damaging any portion of the pulley.

Fig. 4 is a detached perspective view of the hub of said pulley.

Figure 5:
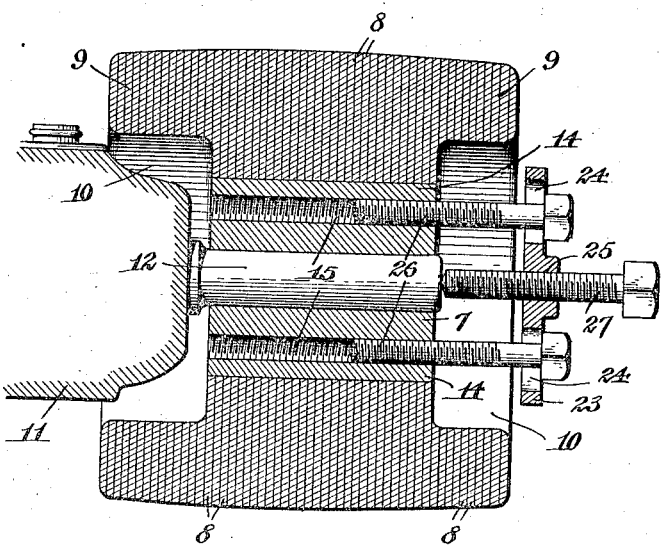
Fig. 5 is a longitudinal section similar to Fig. 1, showing a slightly modified form of pulley.

As is common in laminated pulleys or like elements, a metallic hub 7 is provided, around which layers of papers 8 are applied, said layers being assembled side by side and cemented or otherwise connected together and they may also be pinned together by means of wooden pins or dowels (not shown) extending through the entire assemblage of layers.

A pulley of this kind adapted for use on motor shafts has the paper layers or elements at the ends of the pulley extended beyond the ends of the hub and these layers or elements are invariably provided with central openings larger than the hub so that there are overhanging portions 9 at the inner and outer ends of the pulley, as clearly shown in the drawings, while the intermediate layers have central openings conforming to the exterior cross-sectional formation of the hub which they surround. By reason of such a construction there are comparatively deep depressions or pockets 10 formed at opposite ends of the pulley, the diameter of which is large enough to receive a portion of the motor housing, which is designated by the numeral 11. This enables the hub of the pulley to be slipped onto the motor shaft 12, with the inner end of the hub in close proximity to the motor housing, and with the inner overhanging portion of the pulley surrounding a part of the motor housing. In this manner the center of the pulley is brought very close to the shaft bearing in the motor housing, as will be clearly understood, with the result that the portion of the motor shaft projecting outwardly from the motor housing is subjected to less strain than would otherwise be applied thereto, and the circumferential center of the pulley is brought closer to the shaft bearing. A laminated pulley of this kind having a pocket or depression in each end or, in other words, having each end of the metallic hub thereof terminating a distance from the corresponding end of the paper body portion, enables the pulley to be placed onto the motor shaft with either end surrounding the motor housing. By so constructing the pulley, it is reversible. I have shown this arrangement in Figs. 1 and 5 of the drawings, and in Fig. 6 a modification is shown in which the hub, which I have designated by the numeral 7ª, is also considerably shorter than the paper body portion of the pulley and is disposed at one end of said pulley with a circular flange 13 formed on the hub and extending outwardly therefrom to the outer end of the paper body portion. In the preferred construction shown in Fig. 1 and in both modifications thereof, the hub is forced onto the motor shaft so that the inner end of the hub is in close proximity to the motor housing, although in the modification shown in Fig. 6 the paper body portion of the pulley has no overhanging or surrounding parts at its inner end.

I am aware that a laminated pulley having a metallic hub is not new, and am also aware of the fact that a hub having longitudinally concaved grooves has been known; but in this invention I have designed a metallic hub for the paper body portion of the pulley which has a plurality of longitudinally-disposed enlargements or beads 14 provided with bolt holes 15, these beads having their outer surfaces semi-cylindrical or convex transversely and being connected together by thinner portions of the hub, as at 16, which also have transversely convex exterior surfaces. The portions of the hub between the longitudinal enlargements or beads 14, which may be considered as forming the body portion of the hub, can be made comparatively thin, they being somewhat exaggerated in thickness in the accompanying drawings to better illustrate the invention. The longitudinal enlargements or beads 14 extend outwardly beyond the true exterior of said body portion a sufficient distance to enable the formation therethrough of the bolt holes 15, it being the purpose of my invention to make the metallic hub as light as possible while providing the necessary strength for proper fitting onto the shaft and to withstand all strains to which it may be subjected; and by providing the hub with substantially semi-cylindrical longitudinal enlargements or beads, the added metal required therefor, taking into consideration that each is provided with a bolt hole, would not exceed the amount of material that can be dispensed with at the regions of the hub between said enlargements or beads. Therefore, hubs so constructed need not weigh any more than the metallic hubs now used in laminated or paper pulleys.

To further reduce the weight of the hub without impairing the strength of the same, I preferably "core-out" the hub between its ends, as shown at 17, the hollows thus formed extending partly into the body portion of the hub and partly into the semi-cylindrical enlargements or beads, as clearly shown in Fig. 2, and when this construction is used, each of the bolt holes 15 is formed in two sections, one at either end of a cored-out portion or hollow 17 of the hub. If desired, each section of a bolt hole so formed may be considered as an independent bolt hole extending from the cored-out portion or hollow to one or the other end of the hub, these independent bolt holes so disposed being co-axial and of smaller diameter than said hollow.

In the modification shown in Fig. 5, I have shown a bolt hole extending through the hub from one end thereof to the other without providing a cored-out or hollow intermediate portion; and in this figure and in the preferred construction shown in Fig. 1, retainer bolts are shown threaded into the bolt holes from the outer end of the pulley.

The motor shaft is provided with a key seat 18, and at a point in a plane extending radially between two bolt holes, the hub is provided internally with a key seat 19 in which and the key seat 18 a key 20 is fitted, thus securing the pulley to the shaft and preventing rotation of the pulley on said shaft. However, it has been found desirable in paper or laminated pulleys to provide the pulley with at least one radial screw hole 21 in line with the key and key seats, that portion of the screw hole extending through the metallic hub being threaded while the portion passing through the paper body portion is smooth or unthreaded. A lock or set screw 22 is passed through the portion of the screw hole extending through the paper body portion and threaded into the portion extending through the hub so that the inner end of the set screw bears firmly against the key 18.

Figure 6:
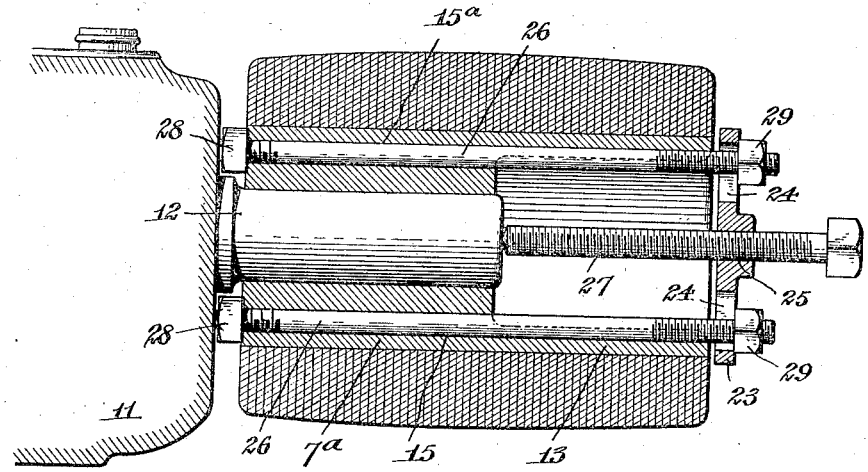
Fig. 6 is a longitudinal section of still another form of pulley constructed in accordance with my invention.

It is to be noted that the bolt holes in the preferred construction shown in Fig. 1, and those in the modification shown in Fig. 5, are screw threaded, while in the modification shown in Fig. 6 I have shown unthreaded bolt holes 15ª extending through the hub.

Paper pulleys of this kind applied to motor shafts are extremely difficult to remove from the shafts owing to the fact that the space between the motor housing and the pulley is not of sufficient size to apply a suitable tool or instrument to the pulley to force the latter from the shaft, and particularly to the hub of the pulley, especially when the paper body portion surrounds the motor housing, as in the case shown in Figs. 1 and 5; and no provision is made elsewhere on a pulley of this kind for otherwise engaging the pulley to pull or force the same from the shaft. Therefore, in attempting to remove a pulley of this type from a shaft, the paper body portion will invariably become damaged, and in many instances it has been found necessary to actually destroy the paper body portion of the pulley in order to reach the metallic hub and apply the necessary force to remove it from the shaft; it being of course understood that severe strains or force, such as required to remove the pulley, cannot be applied to the paper body portion without damage thereto.

I am aware that devices for pulling pulleys or wheels from shafts are not new and therefore do not include in my invention means for removing an ordinary pulley, wheel, or like element from a shaft; but I consider as included in my invention, any pulley, wheel or like element having a metallic hub and a body portion surrounding or carried by the hub, of paper or other material not of sufficient rigidity or strength, without injury thereto, of withstanding strains to which it would be subjected if pressure or pulling strains were applied thereto in the attempt to remove the same from a shaft, and for this purpose I have designed a pulley removing or power applying device to be used in connection with my improved pulley for drawing the complete pulley bodily from the shaft without attempting to force the same outwardly by applying pressure from the inner end of the pulley or hub thereof. In this device I employ a retainer plate 23 which may be of any formation or outline, but preferably is made circular and has radial slots 24 therein and a central screw hole 25.

Through each of the slots 24, a retainer bolt 26 is passed, these bolts being threaded into the bolt holes 15 from the outer end of the hub. When properly arranged, the retainer plate 23 is spaced a distance from the outer end of the hub and a pulling or straining screw 27 is threaded through the screw hole 25 in said plate and against the outer end of the motor shaft. By exerting pressure on the pulling or straining screw 25, the retainer plate 23 will be drawn against the heads of the retainer bolts 26 and the pulley will be drawn outwardly along the shaft; it being of course necessary to first loosen the set screw 21 in order to eliminate all unnecessary binding of the parts which are to be separated.

By providing the retainer plate 23 with radial slots, the same pulling device may be used on pulleys of various sizes owing to the fact that where a large pulley is employed the motor shaft will be larger and consequently the hub proportionately enlarged, which would require the bolt holes in the hub to be spaced greater distances apart.

In the modification shown in Fig. 6, the retainer bolts 26 are differently constructed and the pulling or straining bolt 27 is of greater length. In this modification the retainer bolts 26 are comparatively long and threaded at opposite ends. They are thrust through the pulley from the outer end thereof and threaded into nuts 28 held against the inner end of the hub in line with the bolt holes therein so that the nuts are gradually threaded onto the bolt when rotating the latter; this being permissible due to the fact that while the space between the pulley and the motor housing is not large enough to receive a tool of sufficient strength to force the pulley outwardly on the shaft, it may, in such cases, be large enough to permit the nuts 28 to be slipped into the space and held in position to thread the retainer bolts into them. After these bolts are positioned through the hub and the nuts 28 held against the inner end of the hub, the retainer plate 23 is slipped over the bolts, one bolt being passed through each radial slot 24, and nuts 29 are then threaded onto the outer end of said bolts, after which the parts are in position to apply the necessary strain thereto by rotating the pulling or straining screw 27, which will gradually move the pulley outwardly along the motor shaft so that it can be easily removed from the shaft.

It will be clear from Figs. 1 and 5 of the drawings that the retainer bolts will be threaded into the bolt holes from the outer end of the pulley, and that if the pulleys shown in these figures are reversed on the device, the bolts would be threaded into said bolt holes from the opposite end.

While I have shown my invention embodied in a laminated pulley, it will be clear from the foregoing that laminated wheels or like elements, whether driving or driven, could be constructed with my invention embodied in the hub portion thereof.

Having thus described my invention, what I claim is:—

1. A laminated pulley or the like, having a metallic hub around which laminations of paper or like material are placed, said hub having bolt holes arranged longitudinally therein.

2. A laminated pulley having a metallic hub around which laminations of paper or like material are placed, said hub being hollow between its ends at points spaced around the hub and having bolt holes extending from one end of said hub to the hollows therein.

3. A laminated pulley having a metallic hub around which laminations of paper or like material are placed, said hub being hollow between its ends at points spaced around the hub and having bolt holes extending from each end of said hub to the hollows therein.

4. A laminated pulley having a metallic hub, and a non-metallic body portion surrounding said hub and extending beyond opposite ends of said hub, said hub having bolt holes extending longitudinally therethrough at points spaced around its axis.

5. A laminated pulley having a metallic hub and a non-metallic body portion surrounding said hub, said hub having longitudinal ribs spaced equally around the same and bolt holes extending longitudinally through said hub at said ribs.

6. A laminated pulley having a metallic hub and a non-metallic body portion surrounding said hub and extending beyond opsite ends of said hub, said hub having longitudinal ribs fitting into said non-metallic body portion and bolt holes extending in part through said ribs.

7. A laminated pulley having a metallic hub and a non-metallic body portion surrounding said hub, said hub having a series of exterior ribs fitting into said non-metallic body portion and being hollowed out between its ends at points around the hub and having also bolt holes extending from each end thereof inwardly to said hollowed out portions, said bolt holes being screw threaded.

8. In combination with a motor having a housing and a shaft journaled therein, of a laminated pulley non-rotatably secured to said shaft and comprising a metallic hub and a non-metallic body portion surrounding said hub, said hub having bolt holes therein, a retainer plate spaced from one end of said hub, retainer bolts in said bolt holes and passed through said retainer plate to retain said plate against outward movement, and a straining screw passed through said plate and bearing against the end of said shaft.

9. In combination with a motor having a housing and a shaft journaled therein, of a laminated pulley non-rotatably secured to said shaft and comprising a metallic hub and a non-metallic body portion surrounding said hub, said hub having screw threaded bolt holes therein, a retainer plate spaced from one end of said hub, retainer bolts passed through said retainer plate and having the heads thereof bearing against the outer side of said retainer plate, said retainer bolts being threaded into the bolt holes of said hub, and a straining screw threaded through said retainer plate and bearing against the end of said shaft.

10. A driving or driven element secured to a shaft and having a metallic hub and a non-metallic body portion surrounding said hub, said hub having bolt holes therein, means adapted to engage in said bolt holes, and means to engage the end of said shaft for pulling said element from said shaft without straining the non-metallic body portion of said element.

11. A driving or driven element secured to a shaft and having a metallic hub and a non-metallic body portion surrounding said hub, and power applying means connected to said metallic hub only and adapted to engage the end of said shaft to pull the pulley from said shaft.

In testimony whereof I affix my signature.

JOHN STRASSNER.